March 29, 1938.  A. H. RICHARD  2,112,575
FLOW STABILIZING DEVICE
Filed Nov. 11, 1936
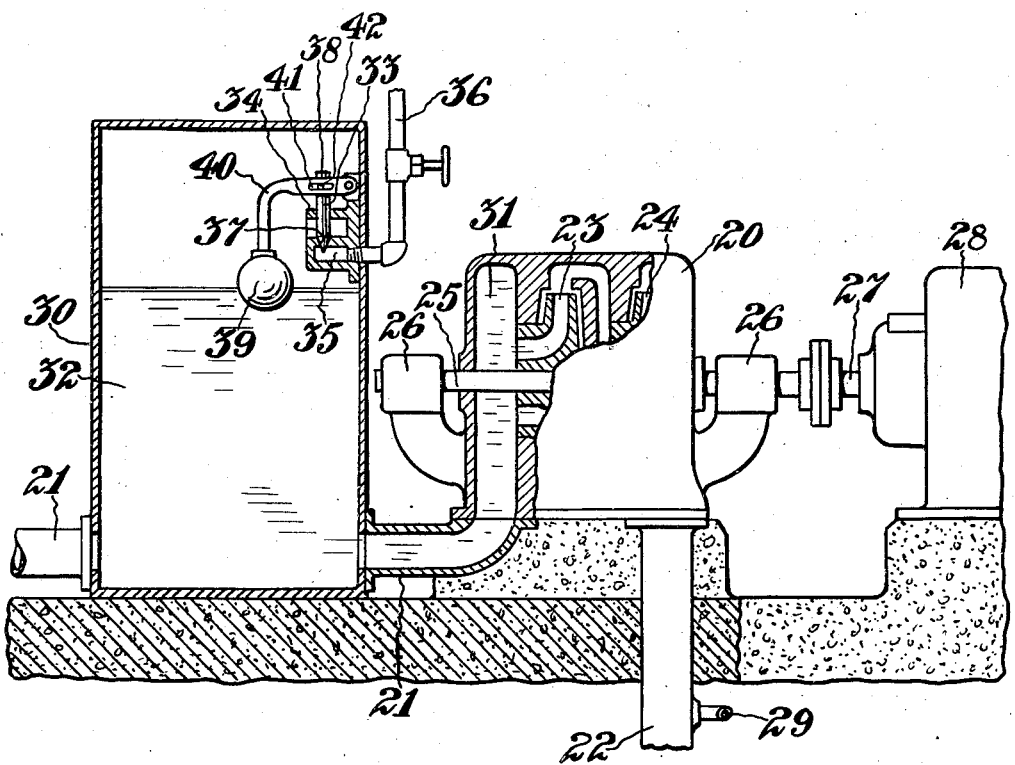
INVENTOR
*Allen H. Richard*
BY
HIS ATTORNEY.

Patented Mar. 29, 1938

2,112,575

UNITED STATES PATENT OFFICE 2,112,575

FLOW STABILIZING DEVICE

Allen H. Richard, Bloomsbury, N. J., assignor to Ingersoll-Rand Company, Jersey City, N. J., a corporation of New Jersey Application November 11, 1936, Serial No. 110,213

2 Claims. (Cl. 103—97)

This invention relates to pumps, and more particularly to a flow stabilizer for centrifugal pumps operating to maintain a hydraulic pressure in the line or element into which it discharges.

In pumping systems of this character, the pump frequently continues to run at full speed and during certain periods of its operation only a sufficient amount of water is discharged to prevent excessive temperature rise of the water within the pump. Obviously, when operating under these conditions the pressure generated by the pump impellers is higher than that generated when supplying maximum demand, and if, then the discharge side of the pump is relieved, as by opening a valve or valves, a severe pressure drop may occur at the inlet end of the pump. This is due to the inability of the water in the inlet conduit to accelerate its velocity quickly enough to maintain the various pump passages filled.

With the valves closed the water in motion within the pump is already at a velocity in excess of normal and does not require acceleration while the liquid on the suction side is far below its normal velocity and must, therefore, be accelerated when the discharge valve opens. Otherwise, the unbalanced pressures to which the rotative parts of the pump become subjected will cause vibration and frequently serious damage to the pump rotor and the casing.

A further undesirable and frequently harmful effect flowing from this condition of intermittently arrested velocity of the liquid on the inlet side of the pump and the consequent unbalanced pressures resulting when the discharge line is opened is that when the liquid in the inlet conduit begins to move its velocity is so far in excess of normal that upon its entrance into the region of subnormal pressure a severe shock is imparted to the rotating parts and to the pump casing.

It is accordingly an object of the present invention to prevent the occurrence of subnormal pressures in the various pump passages and consequently to avoid subjecting the pump parts to undue strains and also to avoid the occurrence of a condition within the pump that may induce severe and harmful vibratory movement of the pump rotor.

Another object is to assure an immediately available supply of liquid adjacent the inlet side of the pump sufficient to maintain the pump passages constantly filled with liquid.

Other objects will be in part obvious and in part pointed out hereinafter.

The figure in the drawing accompanying this specification is a longitudinal vertical view, partly broken away, of a pumping system equipped with a flow stabilizer constructed and arranged in accordance with the practice of the invention.

Referring more particularly to the drawing, 20 designates a centrifugal pump, and 21 and 22 its inlet and discharge conduits, respectively. The pump 20 is shown as being of the multi-stage type having an initial stage impeller 23 and a final stage impeller 24 which are mounted upon a shaft 25 journalled in bearings 26. The shaft is suitably connected to the shaft 27 of a motor 28 whereby the rotary parts of the pump are driven.

Only fragmentary portions of the inlet and discharge conduits are shown, for convenience of illustration, and it is to be understood that the discharge conduit 22 may form a part of a hydraulic system from which the passage of liquid may be controlled by suitable valves, so that, in effect, the pump may be said to discharge into a closed system. The discharge conduit 22 is, however, provided with an orifice 29 that constantly discharges a sufficient amount of liquid to assure circulation of liquid through the pump at all times, and thus prevent undue heating of the liquid within the pump during periods when no liquid is being discharged for its intended purpose.

In accordance with the practice of the invention, means are provided for assuring a readily available supply of liquid and its prompt introduction or delivery to the inlet side of the pump whenever the pressures within the passages in the pump and the impellers tend toward an unbalanced condition. The means selected for illustrative purposes comprises a closed tank 30 which is interposed in the inlet conduit 21. The tank 30 is arranged closely adjacent the inlet side of the pump so that only a minimum length or section of conduit 21 is required to afford communication between the interior of the tank and the inlet chamber 31 of the pump. The sections of the conduit 21 are preferably connected closely adjacent the lowermost portion of the tank 30 and all the liquid supplied to the pump passes through the interior 32 of the tank which constitutes a storage chamber for liquid.

The tank 30 is of such capacity as to contain an amount of liquid sufficient, or in excess of that required, to maintain the pump passages thoroughly filled upon the occurrence of a sudden demand upon the discharge side until the velocity of the liquid in the inlet conduit 21 may reach the rate at which it normally flows when liquid passes from the discharge line for its intended purpose.

To the end that the liquid in the storage chamber 32 may be supplied to the pump under normal pressure, even though the velocity of the liquid in the conduit 21 leading to the storage chamber is below normal, the storage chamber is provided with suitable valve mechanism designated, in general, by 33, adapted to admit gaseous fluid under pressure into the upper portion of the storage reservoir, which is unvented, and above the level of the liquid within the storage reservoir. The valve mechanism 33 comprises a casing 34 having a chamber 35 into which is introduced pressure fluid by a conduit 36 which may lead from a suitable source of pressure fluid supply. In the wall of the chamber 35 is a port 37 which is controlled by a needle valve 38 slidable in the casing 34. The needle valve 38 is actuated to the open position by a float 39 having an arm 40 which is pivoted at its free end to the casing 34 and has a slot 41 to receive a pin 42 carried by the needle valve 38. The arm 40 is preferably of L-shape and on the depending portion thereof is mounted the float member 39.

The operation of the pump is as follows: Let it be assumed that all the valves or outlets on the discharge side of the pump, other than the orifice 29, are closed. Under this condition of operation the pressure within the discharge conduit 22 is, of course, the same or higher than when the pump is discharging its full rated capacity and only an amount of liquid such as that which may pass through the orifice 29 circulates through the pump so that the velocity of the water in the inlet conduit 21 is necessarily low.

Let it further be assumed that, upon the initial introduction of liquid to the pump, the liquid rises in the storage reservoir 32 until it reaches the member 39. The needle valve 38 is then opened and pressure fluid flows from the chamber 35 through the port 37 into the upper portion of the storage chamber.

If then the pressure in the discharge conduit is suddenly reduced the liquid in the storage chamber 32 immediately flows into the passages of the pump under pressure and maintains said passages adequately filled. By suitably proportioning the storage chamber 32 a sufficient supply of liquid may be delivered from the storage chamber to the pump through the brief period of time required by the liquid in the portion of the inlet conduit 21 leading from the supply to gain its normal velocity.

I claim:

1. In a flow stabilizing device, the combination of a centrifugal pump and an inlet conduit therefor, a tank in the inlet line adjacent the inlet opening of the pump forming a storage chamber for liquid and having an unvented upper portion, and means operating in response to a predetermined maximum level of the liquid in the storage chamber for introducing gaseous fluid under pressure into the storage chamber to accelerate the flow of liquid from the storage chamber into the pump.

2. In a hydraulic system, the combination of inlet and discharge conduits and a pump interposed between the conduits and operating to maintain liquid under pressure in the discharge conduit, means interposed in the inlet conduit adjacent the pump forming a storage chamber for liquid, and means in the storage chamber actuated by a predetermined maximum level of liquid in the storage chamber for introducing gaseous fluid under pressure into the storage chamber to accelerate the flow of liquid from the storage chamber into the pump upon the occurrence of a sudden reduction of pressure in the discharge conduit.

ALLEN H. RICHARD.